Feb. 5, 1946.  B. M. CARTER  2,394,426
MANUFACTURE OF OLEUM
Filed Jan. 26, 1942
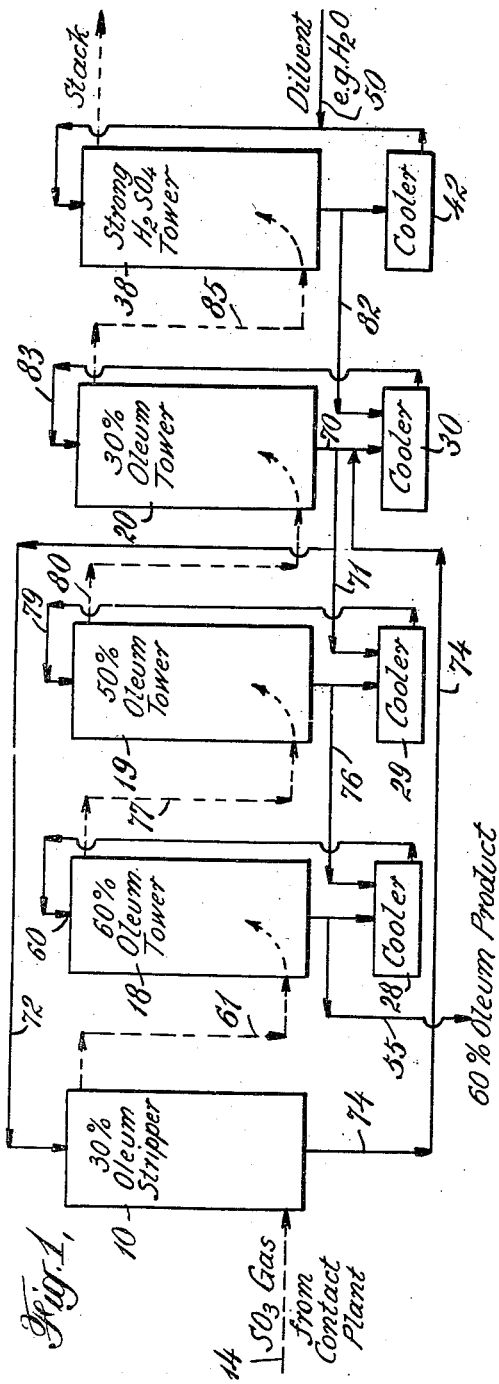
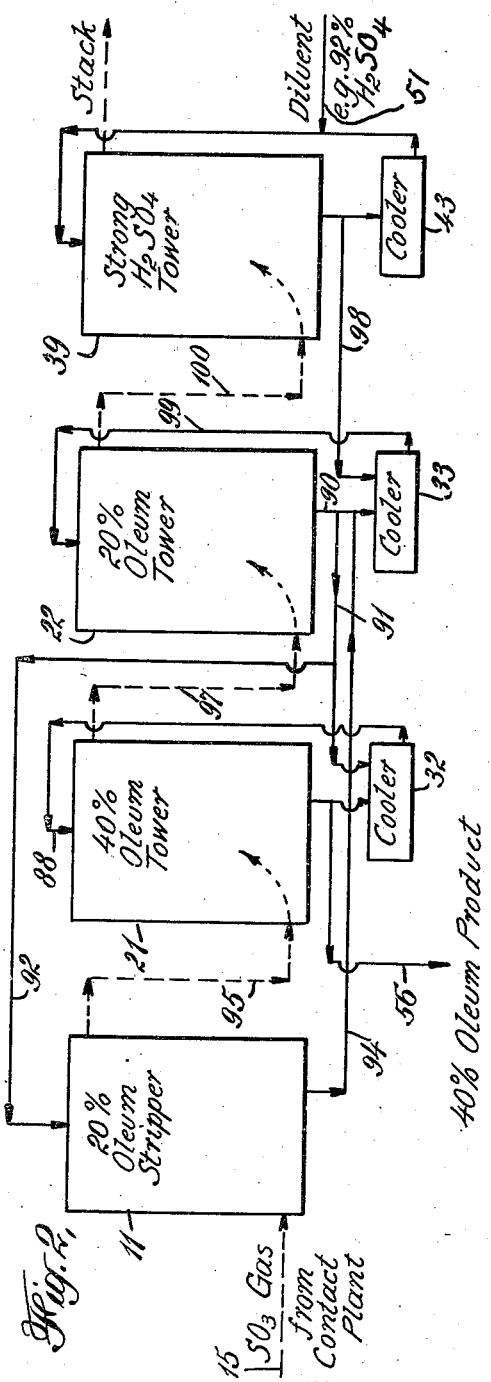
INVENTOR
Bernard M. Carter
BY
ATTORNEY Patented Feb. 5, 1946

2,394,426

UNITED STATES PATENT OFFICE 2,394,426

MANUFACTURE OF OLEUM

Bernard M. Carter, Montclair, N. J., assignor to General Chemical Company, New York, N. Y., a corporation of New York Application January 26, 1942, Serial No. 428,223

3 Claims. (Cl. 23—167)

This invention relates to improvements in processes for manufacture of oleum.

According to prior practice, low and intermediate strength oleum, e. g. up to say 40%, on the one hand and high concentration oleum such as 60% strength on the other hand have been made by two radically differing procedures. For example in production of about 40% or weaker oleum, the $SO_3$ gas exiting an $SO_2$ catalytic oxidation plant at temperature of 425–875° F. is ordinarily cooled down to about 250° F. or less, heat thus extracted from the $SO_3$ gas is removed from the system, and the cooled $SO_3$ gas is introduced into the bottom of a countercurrent absorption tower operated in such a way that the so-called "make" drawn off the liquor circulating circuit of the absorption tower is oleum of the desired strength.

This method for making intermediate or low strength oleum is subject to substantial operating disadvantages. First, it is necessary to cool down the contact plant $SO_3$ gas from temperatures usually of the order of 650–850° F. to about 250° F. (when making 40% oleum) or less before introducing the $SO_3$ gas into the first absorption tower. Incoming $SO_3$ gas is cooled to the extent indicated because if the $SO_3$ gas enters the bottom of the first absorption tower at too high temperatures it is not possible to form in the tower the oleum product of the sought-for strength. Heat thus taken out of the gas is removed from the system and serves no useful purpose therein. More importantly, because of the fairly low $SO_3$ content by volume of contact plant gases of most commercial installations, such $SO_3$ concentration being about 8.5% or less, and also on account of the rapid rise in vapor pressure of oleum at higher concentrations, high strength oleum cannot be made by the direct absorption process. Further, when working with some commercially available low strength $SO_3$ gases, even when making oleum of strength not higher than about 40% by direct absorption, unless a commercially uneconomical number of absorption towers is used, it is not possible to operate the $SO_3$ absorption system so that the system is so-called "balanced," i. e. operated so that all of the incoming $SO_3$— whether introduced as $SO_3$ gas or as $SO_3$ constituent of any liquid diluent used—is converted to oleum of the desired strength, and no $SO_3$ is taken out of the system as intermediate strength oleum or as sulfuric acid. It will be understood that in an unbalanced system producing say 40% oleum as the desired product, operation is such that a portion of the incoming $SO_3$ is drawn out of the system as either sulfuric acid from the final sulfuric acid production tower, or as relatively low strength say 20% oleum from the intermediate low strength oleum production tower.

The principal object of this invention is to provide procedure by practice of which high strength oleum may be made by the direct absorption method even from low concentration $SO_3$ gas. Another object constitutes provision of a process according to which the $SO_3$ concentration of commercially available $SO_3$ gas streams may be sufficiently enriched so that such gas streams may be used for production of high strength oleum by direct absorption. A further important object is provision of a process by which it is alternatively possible to make low or intermediate strength oleum by direct absorption in apparatus in which the absorption towers and associated liquor circulation circuits are from 30 to 55% smaller than corresponding apparatus needed in accordance with the prior art practice to produce oleum of low or intermediate concentration. The invention aims to employ the heat which, in the prior art practice, is removed from the system at the point between the gas exit of a contact plant and the gas inlet of the $SO_3$ absorption and oleum production system, and to utilize this heat in such a manner as to provide for accomplishment of the objects of the invention.

The invention, its objects and the afforded advantages will appear from the following description taken in connection with the accompanying diagrammatic drawings, showing for illustrative purposes, in Fig. 1 apparatus suitable for use in production of 60% oleum, and in Fig. 2 apparatus for manufacture of 40% oleum.

Referring to the drawing, the oleum stripping or $SO_3$ desorption towers 10 and 11 are constructed substantially the same as known sulfuric acid or oleum absorption towers and comprise steel shells lined with acid-proof brick and acid-proof checkerwork or other packing suitably arranged to permit high capacity liquid flow and low resistance to gas flow. Each stripper is arranged for direct gas and liquid contact, and while co-current stripping may be employed, countercurrent flow relation of gas and liquid is preferred. The strippers are provided at the top with a gas outlet and a liquor inlet including a suitable liquor distributor designed to effect thorough dissemination of liquor particles throughout the desorption zone. At the bottom of the stripping towers, beneath the grillework supporting the packing, is a liquor outlet and a gas main such as 14 or 15 connecting the systems illustrated with the gas outlet of the last converter or of the last heat exchanger of a contact plant operated to catalytically oxidize $SO_2$ to $SO_3$.

The design and construction of oleum production towers 18, 19 and 20 (Fig. 1) and 21, 22 (Fig. 2) are usually the same as that of oleum production towers known in the art, and are ordinarily brick-lined steel shells filled with brick checkerwork or other adequate packing. Each tower includes at the top a gas outlet and a liquor inlet and distributing head, and at the bottom a gas inlet and a liquor outlet. Associated coolers 28, 29 and 30 (Fig. 1) and 32 and 33 (Fig. 2) are connected to receive oleum running out of the bottom of the respective oleum production towers. Sulfuric acid production towers 38 and 39, built the same as absorption towers customarily used in manufacture of sulfuric acid from $SO_3$, discharge strong e. g. 99% sulfuric acid into coolers 42 and 43. It will be understood that each of the oleum and sulfuric acid production towers is provided with its own liquor circulating circuit including the respective coolers mentioned along with suitable pipe connections indicated diagrammatically on the drawing, together with pumps and control valves, etc., not shown, all arranged to maintain circulation over the various towers of suitable quantities of oleum or sulfuric acid kept at temperatures required to accomplish the desired $SO_3$ absorption in any particular oleum or sulfuric acid production tower.

Incoming $SO_3$ gas from a contact plant enters thru conduits 14 or 15, passes in series thru the several towers, tail gas containing substantially no $SO_3$ leaves the tops of sulfuric acid production towers 38 and 39 and is discharged into the plant stack. Gas movement thru the systems is indicated on the drawing by dotted lines. The diluent used, either water or sulfuric acid of suitable $H_2SO_4$ strength, is fed into the circulating circuits of sulfuric acid production towers 38 and 39 thru inlets 50 and 51. Liquor flow thru the systems, indicated on the drawing by solid lines, is generally countercurrent to gas flow. The so-called "make" of oleum production towers 18 and 21, drawn off thru lines 55 and 56, constitutes the products of the process.

To take best advantage of the benefits of the invention, the $SO_3$ gas is introduced into a stripping or desorption tower at a temperature as high as practicable. As is known in catalytic $SO_2$ oxidation practice, temperatures of the exit gas of the last converter in a catalytic $SO_2$ oxidation plant are roughly 825–875 F., the upper limit of such temperature being selected to effect maximum conversion of $SO_2$ to $SO_3$ while avoiding dissociation of $SO_3$ to $SO_2$ and oxygen. Some $SO_2$ contact plants include a heat exchanger thru which the $SO_3$ exit of the last converter is immediately passed, such heat exchanger being used to aid in preheating incoming $SO_2$ gas up to initial conversion temperature. In instances where such a heat exchanger is employed, the temperature of the $SO_3$ exit gas of this heat exchanger is ordinarily more than 200° F. less than the temperature of the gas as discharged from the last converter. Hence depending upon the particular type of contact plant used, the temperature of the $SO_3$ gas leaving the $SO_2$ converter plant may vary from about 425° to about 875° F. In the present process, $SO_3$ gas is fed into the bottom of the stripping tower at a temperature as high as feasible, the upper temperature limit being that at which $SO_3$ dissociates to $SO_2$ and oxygen, the lower temperature limit of the $SO_3$ gas being not less than a temperature which is high enough to effect, in the stripping tower, desorption or release of $SO_3$ from the particular oleum fed into the top of the stripping tower at the particular desorption conditions under which such tower is being operated. However, it is preferred to take the hot $SO_3$ gas directly from the exit pipe of the last converter of the contact plant, although there is no objection to using the $SO_3$ gas exiting the heat exchanger immediately following the last converter, if the $SO_3$ conversion system as a whole happens to be an arrangement which includes a heat exchanger immediately associated with the outlet of each converter in the system. Further in the better practice of the invention, the temperature of the incoming $SO_3$ gas should be not less than 150° F. and preferably not less than 250° F. above the temperature of the lower strength oleum being stripped at the point of first contact of incoming $SO_3$ gas with oleum being stripped, e. g. at the bottom of stripping tower illustrated.

According to this invention, there is provided an $SO_3$ stripping or desorption tower, the function of which is to enrich the $SO_3$ content of the absorbing system gas stream and to effect such enrichment by directly contacting in the stripper relatively low strength oleum and $SO_3$ gas under $SO_3$ desorption conditions such as to drive out or release $SO_3$ from such low strength oleum and to form a resultant composite $SO_3$ gas leaving the stripper having an $SO_3$ content higher than the $SO_3$ content of the $SO_3$ gas entering the stripper.

Strength of the oleum fed into the top of the stripper may vary from a concentration of a few percent up to something less than that of the ultimate high strength oleum product of the process. Ordinarily, the oleum supplied to the stripper is of concentration about half that of the product and is preferably a portion of the oleum tower in which the major "make" of the oleum tower in which the major portion of the total $SO_3$ is absorbed, e. g. towers 20 and 22 of the drawing. Since it is desired to carry into the stripper as much heat as possible, intermediate strength oleum is charged into the stripper without cooling and approximately at the maximum temperature of production.

In the stripping step the heat which, in accordance with this invention, is utilized to effect $SO_3$ enrichment of the main $SO_3$ gas stream is the sensible heat contained in the gas entering the stripper over and above the sensible heat contained in the gas stream as introduced into the bottom of the first absorbing tower. To effect stripping of $SO_3$ from any particular intermediate strength oleum, desorbing operation conditions should be such that (a) temperature of oleum leaving the stripper is in excess of the temperature at which oleum of the strength being fed to the desorbing operation is in equilibrium with the $SO_3$ concentration of the particular hot $SO_3$ gas entering the stripper, and (b) temperature of the particular $SO_3$ gas entering the stripper is above the temperature at which such incoming gas of given $SO_3$ concentration is in equilibrium with the particular oleum being fed to the stripper. Further, it will be understood that in a practical operation, whether carried out in a co-current or countercurrent stripping zone, when using an incoming $SO_3$ gas of given $SO_3$ concentration and suitably high temperature desorption of $SO_3$ from any particular intermediate strength oleum used is effected by suitable control or regulation of at least one of operating factors such as quantity of oleum fed into the zone, temperature of such oleum, and the rate of flow of the $SO_3$ gas thru the zone. Practice of the stripping operation is such that the gas stream leaving the stripper has an $SO_3$ content which is from 2 to 18 or more volume percent greater than the volume percent of $SO_3$ in the gas entering the stripper. Extent of stripper exit gas $SO_3$ enrichment depends upon factors such as strength of the oleum fed into the stripper, temperature of the SO₃ gas entering the stripper, rate of gas flow thru the stripper, and temperature and quantity of oleum fed into the stripper. With respect to temperature reduction of the incoming SO₃ gas stream in the stripper, desorption operation is such that the enriched SO₃ gas stream leaving the top of the stripper is at temperature usually the same as but preferably not more than 20–30° F. in excess of the temperature of the oleum entering the top of the stripper. Further, the temperature of the gas stream is reduced to a point suitable for introduction into the bottom of the first absorbing tower.

In the use of an absorption tower, such as tower 18 Fig. 1 of the drawing, the tower is operated so that the temperature of the gas leaving the top of the tower is at a certain maximum depending upon the strength of the oleum product sought to be produced. Such maximum temperature is controlled by regulation of rate of flow of oleum over the tower, and by regulation of temperature of the oleum fed into the top of the tower, this latter regulation being effected by extent of cooling of oleum in the tower circulating system. In a properly designed and operated absorption tower, temperature of the gas leaving and temperature of the oleum entering the tower at the top are about the same. In a commercial size installation, equilibrium conditions between gas and liquor at the point of last contact of gas with liquor, i. e., at the top of the tower, are controlling. Assuming production of 60% oleum in tower 18, introduction into the top of the tower of about 59.5% oleum at temperature of about 80° F. and gas outlet temperature at the top of the tower of about 80° F., at this temperature the SO₃ concentration by volume of gas in equilibrium with oleum in the top of the tower is approximately 14% and unless the SO₃ concentration of the gas entering the bottom of tower 18 thru pipe 61 is sufficiently in excess of about 14%, no SO₃ absorption nor oleum production will take place. It will be understood that the degree of such excess depends upon factors such as size of the tower, rate of oleum production and the temperature conditions at the bottom of the tower.

Particularly as applied to the manufacture of high strength oleum, the purpose of the SO₃ stripper is to raise the SO₃ concentration by volume of the main gas stream to such an extent that the SO₃ concentration by volume of the gas leaving the top of the stripper is in excess of the SO₃ concentration in gas in equilibrium with the oleum at the top of absorbing tower 18. Hence when forming an oleum product of strength which cannot be made by direct absorption of SO₃ out of a particular SO₃ gas being supplied to the system, on the basis that such gas is at suitably high temperature, variable stripper operating control factors—principally strength of oleum supplied to the top of the stripper, rates of gas and liquor flow through the stripper and temperature of the oleum fed to the stripper—are regulated so as to effect release of sufficient SO₃ from the oleum in the stripper to form a resultant stripper exit gas having an SO₃ concentration by volume in excess (preferably at least 1%) of the SO₃ concentration in gas in equilibrium with oleum at the point of last contact of SO₃ gas and absorbing liquid in the absorbing zone producing the ultimate high strength oleum product.

The major advantages afforded by the invention lie in production of relatively high strength oleum, e. g. 40% and above. Principal factors of importance in manufacture of high strength oleum are the sharp rise in vapor pressure as oleum strength increases, and the temperatures at which SO₃ absorption is carried out. Generally speaking, the absorbing operation is effected at temperatures as low as feasible, but the low temperature limits in a given system are dependent upon the freezing points not only of the sought-for high strength oleum product but also of all of the oleum liquors in the system, and further upon the minimum temperature to which it is practical to cool the circulating liquors in commercially economical coolers without resorting to expensive refrigeration. In practice, it is inadvisable to reduce the temperature of the oleum liquor at any point in the system to a figure less than about 10° F. above the freezing point of the oleum at such point. Furthermore, in available cooling equipment which does not include refrigeration, it is not practical particularly in summer to attempt to cool the liquors at any point in the SO₃ absorbing system to less than about 75° F. Hence, having in view the relatively fixed lower temperature limits, i. e. say 75° F. in a commercially practical absorption system or a temperature at least about 10° F. higher than the freezing point of the oleum, together with sharp rise in the vapor pressure of oleum at higher strengths, my invention possesses the substantial operating advantage of facilitating formation of an SO₃ gas stream of strength high enough to provide for absorption temperature requirements and to provide a high strength SO₃ gas in the system from the gas inlet of the first absorber to the gas outlet of the last oleum producing absorber.

The SO₃ concentration of available contact plant converter gases ordinarily ranges from about 6.5% to about 10.5% by volume although in some cases where smelter gases constitute the source of SO₂, SO₃ concentration in converted gases may drop to about 5%, and in cases of efficient operation of catalytic processes using brimstone burners to provide SO₂, SO₃ concentration of converted gases may rise as high as 11%. This invention is directed preferably to the utilization of these commercially available 5–11% SO₃ gases. However, it will be noted that current commercial catalytic SO₂ oxidation practice is such that the SO₃ concentration of converter exit gases is too low to permit use of such gases for production of high strength oleum by direct absorption. The invention offsets this difficulty. To illustrate, assuming it is desired to produce 60% oleum as indicated in Fig. 1 of the drawing, and also assuming it is impractical in economical cooling equipment to cool the oleum circulating over tower 18 to such an extent that the temperature of the oleum entering the tower at 60 is much less than about 80° F., from previous discussion of equilibrium conditions in the tower it will be understood that in order to effect appreciable absorption of SO₃ in the tower the SO₃ content of the gas entering the bottom of the tower 18 thru line 61 should be something in excess of about 14% by volume. By practice of this present invention, the SO₃ concentration of an SO₂ converter exit gas may be increased readily in the stripper 10 to such an extent that the stripper exit gas SO₃ content is well above the needed 14%.

The invention affords the primary advantage, especially in the manufacture of the high strength oleums, of enriching the SO₃ content of the main SO₃ gas stream in the system so that the SO₃ concentration is high enough to make possible the use of such gas stream for reproduction of high strength oleum by simple direct absorption procedure. Moreover, such SO₃ enrichment is effected by utilization of the sensible heat of converter plant exit gases which sensible heat, according to all prior methods known to me for making oleum, is taken out of the gas stream and removed from the entire system at a point between the converted outlet and the inlet of the first SO₃ absorption tower.

In the prior practice for manufacture of relatively high strength oleum, e. g. above 40%, low or intermediate strength oleum is heated in a vessel equipped with steam coils to vaporize off substantially 100% SO₃ which is thereafter absorbed in medium strength oleum to produce the desired high strength product. This practice requires use of expensive boiling vessels and heating coils, and consumption of extraneous heat (steam) to boil off the SO₃, and since the procedure is batch-wise, it is often necessary to repeat the operation several times before obtaining oleum of the desired high strength. Another factor involved in such prior practice is the inherent difficulty of inducing adequate flow of the substantially 100% SO₃ thru the oleum in which the SO₃ is to be absorbed, and the art has been compelled to resort to various inconvenient and none too effective means to bring about the required flow.

In the following examples, rates of gas flow are given in terms of cubic feet per minute, quantities of liquors are given in pounds per minute, and liquor production of each of the absorbing towers is in pounds per minute. Further, rate of liquor feed to the several towers in the systems described may vary from about 1000 to about 3200 pounds per minute, the exact quantity being determined by the temperature control desired in such towers.

Example 1 is illustrative of manufacture of 60% oleum in apparatus such as disclosed in Fig. 1 of the drawing:

*Example 1*

Gas containing 57.7 pounds (258 cubic feet) of SO₃, 8.6% SO₃ by volume, is fed into the bottom of stripper 10 thru pipe 14 at temperature of about 500° F. and at a rate of 3000 cubic feet per minute. This SO₃ gas is obtained by roasting pyrites to produce an SO₂ gas which is oxidized to SO₃ in a contact plant of the type in which a heat exchanger is associated with each converter. Hence, the 500° F. temperature of the gas in line 14 is substantially less than the temperature of the SO₃ gas discharged from the last converter.

The 30% oleum production tower 20 is operated so that the 30% oleum running out thru pipe 70 is at a temperature a little above 160° F. 344.6 pounds of 30% oleum are drawn out from pipe 71 and fed by pipe 72, at temperature of 160° F., into the top of stripper 10 in which countercurrent flow of oleum and incoming SO₃ gas is such that a 15% oleum (283.8 pounds) at temperature of 205° F. is discharged from stripper 10 thru pipe 74 by means of which such partially stripped oleum is returned to cooler 30 and reintroduced into the circulating system of the 30% oleum production tower 20. In stripper 10, 60.8 pounds (272 cubic feet) of SO₃ are vaporized out of the 30% oleum fed in thru pipe 72, and the SO₃ gas leaving stripper 10 thru pipe 61, at temperature of about 165° F., contains 118.5 pounds (530 cubic feet) of SO₃ at concentration of 16.2% by volume.

49.8 pounds per minute of the "make" of 50% oleum of tower 19 are run thru pipe 76 into cooler 28 of tower 18. Liquor cooling and circulation are regulated so that oleum of about 59.6% strength is fed into the top of tower 18 thru pipe 60 at a temperature of 80° F. Contact of gas and liquor in tower 18 is such that 12.4 pounds (56.6 cubic feet) of SO₃ are absorbed, 60% oleum product formation amounting to 62.2 pounds per minute. The gas leaving the top of the tower 18 thru line 77, at temperature of about 80° F., contains 106 pounds (474.4 cubic feet) of SO₃ and has an SO₃ concentration of 14.7% by volume.

35.4 pounds of "make" of 30% oleum from tower 20 are run thru pipe 71 into cooler 29 for dilution in tower 19 circulating system in which liquor circulation and cooling are such that oleum of about 49.4% strength is fed into the top of tower 19 thru pipe 79 at temperature of 105° F. 14.4 pounds (64.4 cubic feet) of SO₃ are absorbed and 49.8 pounds of 50% oleum are produced. A 13% by volume SO₃ gas, at temperature of about 105° F. and containing 91.7 pounds (410 cubic feet) of SO₃, leaves tower 19 thru pipe 80 and enters the bottom of 30% oleum production tower 20. 283.8 pounds of 15% oleum from stripper 10 and 24 pounds of 99.3% sulfuric acid from tower 38 are introduced thru pipes 74 and 82 into cooler 30. Rate of cooling and of liquor circulation in the circulating system of tower 20 are regulated so that oleum of strength of about 27% and at a temperature of 115° F. is fed into the top of tower 20 thru pipe 83. Gas and liquor contacting are such that 72.2 pounds (322.8 cubic feet) of SO₃ are absorbed, and 30% oleum production amounts to 380 pounds. The gas stream passing thru pipe 85 into the bottom of sulfuric acid production tower 38 is at temperature of about 115° F. and contains 19.5 pounds (87.2 cubic feet) of SO₃, and has an SO₃ concentration of 3.1% by volume.

The liquor cooling and circulating system of sulfuric acid tower 38 is operated to produce 99.3% strength sulfuric acid, and when so proceeding 4.52 pounds per minute of diluting water are fed thru pipe 50 into the circulating system of tower 38. All of the 19.5 pounds of SO₃ entering thru pipe 83 is absorbed, and the stack tail gas is free of SO₃. Hence, in this example, the system is balanced, i. e. all of the SO₃ is converted to oleum of the desired strength, and no SO₃ is taken out of the system as sulfuric acid or as oleum of any intermediate strength.

*Example 2*

This example illustrates production of 60% oleum in apparatus similar to that disclosed in Fig. 1 of the drawing except that a single 35% oleum production tower is used in place of the 30% and 50% production towers of the drawing. Use of a single intermediate strength oleum tower is made possible to a lesser extent by use of a fairly strong incoming SO₃ and to a greater extent by the high SO₃ concentration obtainable in the SO₃ desorption tower.

Gas containing 71.8 pounds (321 cubic feet) of SO₃, 10.7% SO₃ by volume is fed into the bottom of a stripper at temperature of about 700° F. and at a rate of 3000 cubic feet per minute. This SO₃ gas is obtained by burning brimstone to produce an SO₂ gas which is oxidized to SO₃ in a contact plant.

A 35% oleum production tower is operated so that the 35% oleum running out of the base thereof is at temperature a little above 140° F. 470 pounds of the 35% oleum "make" are fed at temperature of 140° F. into the top of the stripper in which countercurrent flow of oleum and incoming $SO_3$ gas is such that a 15% oleum (359.4 pounds) at temperature of 210° F. is discharged from the stripper into a pipe by means of which such partially stripped oleum is returned to the cooler of and reintroduced into the circulating system of the 35% oleum production tower. In the stripper, 110.6 pounds (494.6 cubic feet) of $SO_3$ are vaporized out of the 35% oleum fed into the stripper, and the $SO_3$ gas leaving the stripper, at temperature of about 145° F., contains 182.4 pounds (815.6 cubic feet) of $SO_3$, $SO_3$ concentration being 23.3% by volume.

47.7 pounds per minute of the "make" of 35% oleum are run into the cooler of the 60% oleum production tower. Liquor cooling and circulation are regulated so that oleum of about 59.2% strength is fed into the top of the 60% oleum production tower at temperature of 91° F. Contact of gas and liquor in the 60% oleum tower is such that 29.8 pounds (133.2 cubic feet) of $SO_3$ are absorbed, 60% oleum product formation amounting to 77.5 pounds per minute. The gas leaving the top of the 60% oleum tower, at temperature of about 91° F., contains 152.6 pounds (682.4 cubic feet) of $SO_3$ and has an $SO_3$ concentration of 20.3% by volume.

359.4 pounds of 15% oleum from the stripper and 30.1 pounds of 99.3% sulfuric acid from the sulfuric acid production tower are introduced into the cooler of the 35% oleum production tower. Rate of cooling and of liquor circulation in the circulating system of the 35% oleum tower are regulated so that oleum of strength of about 33% and at a temperature of 110° F. is fed into the top of the 35% oleum tower. Gas and liquor contacting are such that 128.2 pounds (573.4 cubic feet) of $SO_3$ are absorbed, and 35% oleum production amounts to 517.6 pounds. The gas stream passing into the bottom of the sulfuric acid production tower is at temperature of about 110° F. and contains 24.4 pounds (109 cubic feet) of $SO_3$, and has an $SO_3$ concentration of 3.9% by volume.

The liquor cooling and circulating system of the sulfuric acid tower is operated to produce 99.3% strength sulfuric acid, and when so proceeding 5.70 pounds per minute of diluting water are fed into the circulating system of the sulfuric acid production tower. All of the 24.5 pounds of $SO_3$ entering the sulfuric acid tower is absorbed, and the stack tail gas is free of $SO_3$. Hence, in this example, the system is balanced, and no $SO_3$ is taken out of the system as sulfuric acid or oleum of intermediate strength.

In the past oleum up to about 40% strength has been made by direct absorption of converter $SO_3$ gas. The freezing point of 40% oleum is about 95° F., and in order to prevent freezing it has been customary to introduce the circulating oleum into the top of the 40% oleum production tower as at 88 Fig. 2 of the drawing at a temperature of about 105° F. At this temperature, the $SO_3$ content by volume of the vapor in equilibrium with the oleum in the top of the tower is about 4.75%. Since converter $SO_3$ gases may have an $SO_3$ content of say 7 to 11%, it has been feasible when using such gases to make as high as 40% oleum by cooling such $SO_3$ gases down to about 225° F. and introducing the cooler gases directly into the bottom of the 40% oleum production tower. However, in most commercial installations, the $SO_3$ gas is derived by catalytic oxidation of the $SO_2$ gas produced by the roasting of pyrites or pyrrhotite with the consequence that the $SO_3$ gas leaving the converter has an $SO_3$ concentration of usually less and rarely over about 8½% $SO_3$. Thus, in working with relatively low concentration gases it is necessary in the prior art practice for making say 40% oleum by direct absorption to employ relatively large size absorbing apparatus and correspondingly high capacity coolers and pumps in the oleum circulating systems. For example, in order to produce 40% oleum from 7% $SO_3$ gas it is necessary to provide gas cooling and absorption equipment capable of handling about four volumes of gas in order to absorb the amount of $SO_3$ present in one volume of gas. On the other hand, in order to produce 40% oleum from about a 10.7% $SO_3$ gas it is necessary to provide gas cooling and absorbing equipment to handle only about 2.1 volumes of gas to absorb the $SO_3$ present in one volume of 10.7% $SO_3$ gas. Thus, it will be seen that by raising the $SO_3$ content of the gas from about 7 to about 10.7% the size of the equipment needed in the oleum production system is reduced almost 50%.

Another disadvantage encountered in practice, when producing oleum of say 40% strength from low concentration $SO_3$ gases, is that it is extremely difficult to maintain a balanced system without the uneconomical and almost prohibitive use of a large number of absorbing towers. The reason for this is that with a low concentration $SO_3$ gas, only a small portion of the $SO_3$ can be absorbed in the 40% production tower, and in order to clean all of the $SO_3$ out of the gas stream the intermediate strength oleum tower and the sulfuric acid tower must be operated at a capacity to produce more intermediate strength oleum than can be fortified to produce 40% oleum in the 40% oleum tower. The present process provides for raising the $SO_3$ concentration of the gas stream to such an extent as to facilitate enough $SO_3$ absorption in the 40% oleum tower to fortify all of say 20% oleum to 40% strength, thus making possible operation of a balanced system in a three tower absorption plant.

While the major advantages afforded by the present invention are in the production of high strength oleums above, e. g. 40%, it should be understood that the invention is not thus limited but may be used also in the manufacture of oleum of concentration of 40% or less. When so employed, the advantages provided are substantial reduction in size of the absorbing towers and associated oleum circulating circuits, operation of balanced systems, and further the utilization of weak gases (e. g. 4 or 5% $SO_3$) which heretofore could not be used for production of say 40% oleum by direct absorption.

Following Example 3 is illustrative of manufacture of 40% oleum in apparatus such as disclosed in Fig. 2 of the drawing.

*Example 3*

Gas containing 47 pounds (210 cubic feet) of $SO_3$, 7.0% $SO_3$ by volume, is fed into the bottom of stripper 11 thru pipe 15 at temperature of about 440° F. and at a rate of 3000 cubic feet per minute. This $SO_3$ gas is obtained by roasting pyrrhotite to produce an $SO_2$ gas which is oxidized to $SO_3$ in a contact plant of the type in which a heat exchanger is associated with each converter. Hence, the 440° F. temperature of the gas in line 15 is substantially less than the temperature of the $SO_3$ gas discharged from the last converter.

The 20% oleum production tower 22 is operated so that the 20% oleum running out thru pipe 90 is at temperature a little above 180° F. 210.5 pounds of 20% oleum are drawn out from pipe 91 and fed by pipe 92, at temperature of 180° F., into the top of stripper 11 in which countercurrent flow of oleum and incoming $SO_3$ gas is such that a 5% oleum (177.3 pounds) at temperature of 270° F. is discharged from stripper 11 thru pipe 94 by means of which such partially stripped oleum is returned to cooler 33 and reintroduced into the circulating system of the 20% oleum production tower 22. In stripper 11, 33.3 pounds (148.7 cubic feet) of $SO_3$ are vaporized out of the 20% oleum fed in thru pipe 92, and the $SO_3$ gas leaving stripper 11 thru pipe 95, at temperature of about 180° F., contains 80.3 pounds (358.7 cubic feet) of $SO_3$ at concentration of 11.4% by volume.

63.4 pounds per minute of the "make" of 20% oleum of tower 22 are run thru pipe 91 into cooler 32 of tower 21. Liquor cooling and circulation are regulated so that oleum of about 39.5% strength is fed into the top of tower 21 thru pipe 88 at temperature of 120° F. Contact of gas and liquor in tower 21 is such that 21.1 pounds (94.5 cubic feet) of $SO_3$ are absorbed, 40% oleum product formation amounting to 84.5 pounds per minute. The gas leaving the top of the tower 21 thru line 97, at temperature of about 122° F., contains 59.1 pounds (264.2 cubic feet) of $SO_3$ and has an $SO_3$ concentration of 8.7% by volume.

177.3 pounds of 5% oleum from stripper 11 and 49.2 pounds of 99.3% sulfuric acid from tower 39 are introduced thru pipes 94 and 98 into cooler 33. Rate of cooling and of liquor circulation in the circulating system of tower 22 are regulated so that oleum of strength of about 18% and at a temperature of 120° F. is fed into the top of tower 22 thru pipe 99. Gas and liquor contacting are such that 46.4 pounds (212.2 cubic feet) of $SO_3$ are absorbed, and 20% oleum production amounts to 273.9 pounds. The gas stream passing thru pipe 100 into the bottom of sulfuric acid production tower 39 is at temperature of about 120° F. and contains 11.7 pounds (52.2 cubic feet) of $SO_3$, and has an $SO_3$ concentration of 1.8% by volume.

The liquor cooling and circulating system of sulfuric acid tower 39 is operated to produce 99.3% strength sulfuric acid, and when so proceeding 37.2 pounds per minute of diluting 92.1% $H_2SO_4$ are fed thru pipe 51 into the circulating system of tower 39. All of the 11.67 pounds of $SO_3$ entering thru pipe 100 is absorbed, and the stack tail gas is free of $SO_3$. Hence, as in other examples, the system is balanced, and no $SO_3$ is taken out of the system as sulfuric acid or intermediate strength acid. About 37% of the total oleum production is derived from the incoming 92.1% diluting acid.

I claim:

1. In the manufacture of oleum in a system including a catalytic $SO_2$ oxidation plant forming a hot $SO_3$ exit gas, an oleum product production stage, at least one intermediate strength oleum production stage, and a sulfuric acid production, stage, in which system the $SO_3$ gas is passed thru said stages in the order named and absorbing liquor is flowed in the reverse direction, the steps comprising introducing into the sulfuric acid production stage absorbing liquor of the group consisting of water and sulfuric acid, introducing intermediate strength oleum into and dispersing the same in an $SO_3$ desorption zone, bringing the hot $SO_3$ exit gas of said plant into said zone and into intimate direct counter-current contact with the dispersed oleum therein, regulating said contacting step to effect desorption of $SO_3$ from said oleum by means of the sensible heat of said hot $SO_3$ gas while said oleum and gas are in direct contact, introducing the thereby resultant enriched $SO_3$ gas exiting the desorption zone into the oleum product production stage regulated to absorb $SO_3$ and form oleum product, and passing the $SO_3$ gas stream exiting the oleum production stage and containing residual $SO_3$ thru the intermediate strength oleum and sulfuric acid production stages.

2. In the manufacture of oleum in a system including a catalytic $SO_2$ oxidation plant forming a hot $SO_3$ exit gas, an oleum product production stage, at least one intermediate strength oleum production stage, and a sulfuric acid production stage, in which system the $SO_3$ gas is passed thru said stages in the order named and absorbing liquor is flowed in the reverse direction, the steps comprising introducing into the sulfuric acid production stage absorbing liquor of the group consisting of water and sulfuric acid, withdrawing intermediate strength oleum from an intermediate strength oleum production stage and dispersing the same in an $SO_3$ desorption zone, bringing the hot $SO_3$ exit gas of said plant into said zone and into intimate direct counter-current contact with the dispersed oleum therein, regulating said contacting step to effect desorption of $SO_3$ from said oleum by means of the sensible heat of said hot $SO_3$ gas while said oleum and gas are in direct contact, introducing the thereby resultant enriched $SO_3$ gas exiting the desorption zone into the oleum product production stage regulated to absorb $SO_3$ and form oleum product, passing the $SO_3$ gas stream exiting the oleum production stage and containing residual $SO_3$ thru the intermediate strength oleum and sulfuric acid production stages, and regulating flow of $SO_3$ gas and of absorbing liquor thru said stages so that substantially all of the incoming $SO_3$ and any sulfuric acid absorbing liquor introduced into said stages are discharged from the system as oleum product.

3. The process for making oleum of predetermined strength higher than can be made by direct absorbtion of $SO_3$ out of a given hot $SO_3$ exit gas of a catalytic oxidation plant which process comprises directly contacting said hot $SO_3$ gas in counter-current relation with dispersed oleum of strength lower than said predetermined strength, regulating said contacting operation so as to effect release, by means of sensible heat of said $SO_3$ gas, of sufficient $SO_3$ from said low strength oleum to form a resultant gas having an $SO_3$ concentration by volume in excess of the $SO_3$ concentration by volume in gas in equilibrium with oleum at the point of last contact of $SO_3$ gas with absorbing liquid in an absorbing zone in which oleum of said predetermined strength is produced, contacting said resultant $SO_3$ gas with oleum in said absorption zone, and regulating said latter contacting operation to increase the $SO_3$ strength of such oleum up to said predetermined strength.

BERNARD M. CARTER.